United States Patent
Lampart et al.

[11] 3,710,110
[45] Jan. 9, 1973

[54] IONIZATION FIRE ALARM DEVICE WITH SHIELDING FOR ITS ELECTRICAL CIRCUITRY

[75] Inventors: Thomas Lampart, Mannedorf; Andreas Scheidweiler, Max Kuhn, both of Stafa, all of Switzerland

[73] Assignee: Cerberus AG, Mannedorf, Switzerland

[22] Filed: May 14, 1970

[21] Appl. No.: 37,256

[30] Foreign Application Priority Data

May 19, 1969 Switzerland..........................7606/69

[52] U.S. Cl............................250/83.6 FT, 313/313
[51] Int. Cl...............................................G08b 17/10
[58] Field of Search....250/44, 83.6 FT; 313/54, 313; 174/35 TS

[56] References Cited

UNITED STATES PATENTS 3,448,261  6/1969  Amiragoff..................250/83.6 FT X
3,231,778  1/1966  Allgaier................................313/313

Primary Examiner—James W. Lawrence
Assistant Examiner—Davis L. Willis
Attorney—Werner W. Kleeman

[57] ABSTRACT

An ionization fire alarm which is of the type comprising a measuring or detecting ionization chamber electrically connected in series with a resistance element, preferably constructed as a reference ionization chamber, and wherein an electrode of the measuring ionization chamber is in the form of a plate arranged to shield the interior of the measuring ionization chamber from an electrical circuit to which such electrode is connected. According to further important aspects of the invention, the aforementioned reference ionization chamber also has an electrode in the form of a plate likewise arranged to shield the interior of such reference ionization chamber from the electrical circuit. The electrical circuit is advantageously positioned between the two plate electrodes.

10 Claims, 1 Drawing Figure

PATENTED JAN 9 1973
3,710,110
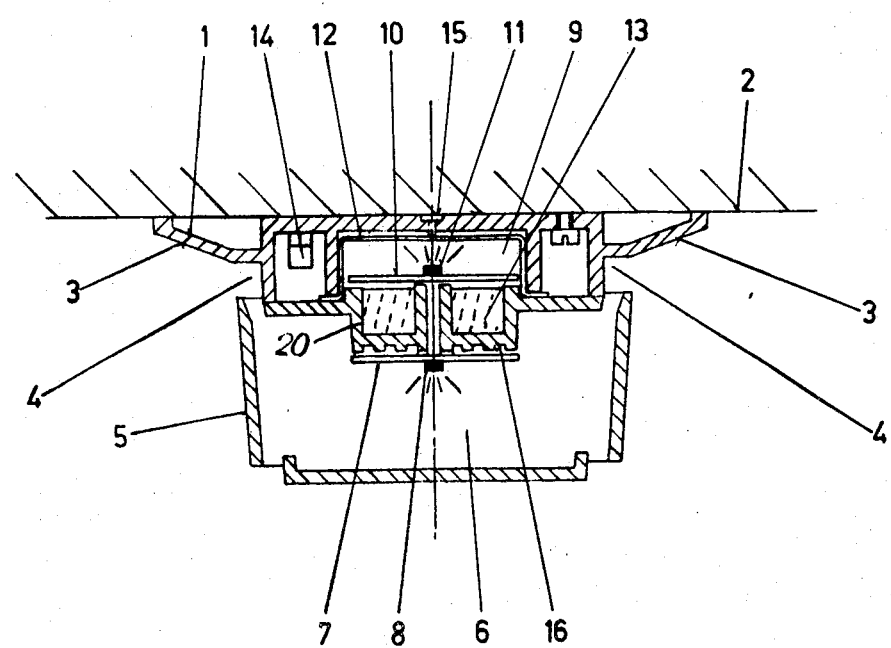
INVENTORS
THOMAS LAMPART
ANDREAS SCHEIDWILER
MAX KUNN
BY *Steiner St. Klarman*
ATTORNEY

IONIZATION FIRE ALARM DEVICE WITH SHIELDING FOR ITS ELECTRICAL CIRCUITRY

BACKGROUND OF THE INVENTION

The present invention relates to a new and improved ionization fire alarm of the type incorporating a detecting or measuring ionization chamber electrically coupled in series with a resistance element, preferably constructed as a reference ionization chamber, and further includes an electrical amplifier and threshold detector circuit for sounding an alarm.

The operation of known ionization fire alarms is predicated upon the fact that ion flow between two electrodes in an ionization chamber, generated by means of a radioactive preparation, depends upon the amount of combustion aerosols or smoke present in the gas content of the measuring or detection ionization chamber. In order to measure current changes in the measuring ionization chamber such is usually connected in series with a resistance element across a voltage source. In most instances, there is employed as the resistance element a reference ionization chamber which is substantially inaccessible to combustion aerosols or is only very slightly affected by such aerosols. The measuring ionization chamber and the reference ionization chamber constitute a voltage divider. A change of the voltage at the junction point between these two chambers may be used as a measure of the density of smoke or combustion aerosols in the measuring ionization chamber. This voltage change is applied to an electrical circuit amplifying the input signal, and when a predetermined threshold level is exceeded this electrical circuit delivers a signal to a central signal station and in this manner triggers an alarm.

The use of a reference ionization chamber in place of a passive resistance element is preferred in order to be able to compensate for atmospheric influences, such as pressure, temperature or humidity fluctuations, by means of suitable diffusion apertures or openings provided for this reference ionization chamber which permit pressure equalization with the ambient atmosphere, yet do not allow the entry of aerosols.

The employment of known ionization fire alarm devices constructed in accordance with this principle encounter certain difficulties in spaces such as commercial premises, conference halls, hotels, theatres, museums and the like, where the presence of technical installations and apparatus is undesirable. The external form of the fire alarm detectors must be chosen such that the fire alarms as far as possible are decorative and unobtrusive, in particular, in no case should they be of excessive dimensions. This limits the internal space and arrangement of the components in the interior of the fire alarm device. On the other hand, it is oftentimes necessary to avoid any damage to the ceiling of the space, that is, the fire alarm device also must be capable of use in decorative environments and mountable at plaster or similar type surfaces.

The small space available, especially the requisite small height of the ionization fire alarm requires new technological solutions. The measuring chamber proper cannot be arbitrarily reduced in dimension without unacceptably reducing the detection sensitivity. The dimensions and construction of the two chambers must be chosen so that the insulation resistances remain sufficiently high, preferably above $10^{11}$ ohms, in order not to reduce the integrity or reliability of the fire alarm device. On the other hand, it has been found that because of the propagation characteristics of smoke emanating from a fire in an enclosed space, it is advantageous for early response of the alarm device if the entrance apertures of the measuring or detecting chamber are arranged as close as possible to the ceiling of the space. Hence, the measuring or detecting chamber itself must be positioned as near as possible to the mounting surface. Since the space for the remaining components, that is, for the electrical circuit, thus becomes extraordinarily limited, the electrical circuit in a known construction has taken the form of a printed circuit which is positioned between the measuring ionization chamber and the reference ionization chamber. Compared with older prior art fire alarm devices in which the electrical circuitry is situated outside the region of these chambers, usually in a base or socket sunk into the mounting surface, difficulties arise because the currents flowing in the electric circuit affect the ionization current in the chambers. In order not to reduce the detection reliability of the device, the amplification gain and the change of current upon exceeding a threshold level must be chosen relatively high. This, however, requires increased expense and an increased number of components, which can no longer be fitted within the housing of the miniaturized fire alarm housing.

SUMMARY OF THE INVENTION

Accordingly, it is a primary object of the present invention to provide a new and improved ionization fire alarm of the aforementioned type which effectively overcomes the drawbacks experienced with the prior art constructions.

Another, more specific objective of the present invention relates to the provision of an improved miniaturized ionization fire alarm possessing increased reliability and sensitivity with respect to its fire detection functions, without the electric circuitry having a disturbing influence upon the ionization current.

Still a further significant object of the present invention relates to an improved ionization fire alarm which, notwithstanding its reduced dimensions as compared with prior art fire alarms of this type, possesses an improved sensitivity, increased reliability and affords earlier response of the ionization fire alarm to conditions which are to be detected thereby.

Now, in order to implement these and still further objects of the invention, which will become more readily apparent as the description proceeds, the ionization fire alarm of the present invention is of the type comprising a measuring ionization chamber electrically connected in series with a resistance element, preferably constructed as a reference ionization chamber. According to one important aspect of the invention, an electrode of the measuring ionization chamber is in the form of a plate arranged to shield the interior of such measuring ionization chamber from an electrical circuit to which such electrode is coupled.

A further manifestation of the invention contemplates designing the electrode of the reference ionization chamber likewise in the form of a plate arranged to shield the interior of such reference ionization chamber from the aforementioned electrical circuit. The electrical circuit itself is advantageously positioned between both of these plate electrodes.

BRIEF DESCRIPTION OF THE DRAWING

The invention will be better understood, and objects other than those set forth above, will become apparent, when consideration is given to the following detailed description thereof. Such description makes reference to the annexed drawing wherein the single figure illustrates in cross-sectional view a preferred embodiment of inventive ionization fire alarm.

DETAILED DESCRIPTION OF THE PREFERRED EMBODIMENT

Describing now the drawing, the single figure illustrates in cross-sectional view a preferred exemplary embodiment of inventive ionization fire alarm device which may be secured with the aid of a base or socket 1 to the supporting or mounting surface 2, for instance the ceiling of a room. The peripheral portions 3 of the base or socket 1 are constructed to partake the form of a truncated cone, so that smoke-containing air flowing directly along the ceiling is led into openings or apertures 4 in a housing 5 fastened to this base 1. The interior of housing 5, for the most part, is occupied by the measuring or detecting ionization chamber 6. Measuring ionization chamber 6 embodies a central electrode 7 on which is placed a radioactive preparation or substance 8 for ionizing the air in the interior of this measuring ionization chamber. The housing 5 serves as the second electrode of the measuring ionization chamber 6.

The remaining components of the ionization fire alarm are designed so small and flat that the flow direction of the air entering into the measuring chamber 6 through the apertures 4 is not substantially deflected, so that the entrance of such air is substantially unobstructed. Consequently, this advantageously ensures that the ionization fire alarm will respond at the earliest possible moment to the presence of smoke or combustion aerosols. For this reason the reference ionization chamber 9 is also made relatively flat. It likewise contains a central electrode 10 carrying a radioactive preparation or substance 11 and a substantially hood-shaped member 12 conveniently serving as the counter-electrode, which itself forms the chamber wall and almost closes off the reference chamber 9 from the external atmosphere, but only to the extent that pressure equalization can still take place between the external atmosphere and the interior of the reference chamber 9.

The two central electrodes 7 and 10 of the measuring and reference ionization chambers 6 and 9 are formed as flat plates, preferably of circular form, although other shapes are of course possible. These two central electrodes 7, 10 are connected with one another and with the input of a suitable electric circuit of known type, generally designated by reference numeral 13. This electric circuit is limited to a minimum number of components and may, for example, consist of a suitable field-effect transistor, possibly with the necessary load resistors, or an integrated circuit with a high-impedance amplifier element at its input and a further semiconductor device. The individual components of this electrical circuit 13 are fitted in a very compact form into the cylindrical or prismatic space between the two central electrodes 7 and 10. Preferably, in order to avoid the effects of humidity and so forth, the whole circuit is encapsulated in a block of insulating material, conveniently designated by reference numeral 20. Typical electrical circuitry suitable for the purposes of the invention, by way of example and not limitation, have been disclosed and described in the commonly assigned United States application, Serial No. 19, 242, of one of the inventors of this application, Andreas Scheidweiler, filed Mar. 13, 1970 and entitled "Ionization Fire Alarm", to which reference may be readily had.

The screening provided by the two metallic plate electrodes 7 and 10 protects against influencing in any way the flow of ionization current between these central electrodes 7, 10 and the outer electrodes 5, 12 by virtue of changes of the current within the electrical circuit 13. In previous constructions, this result was only obtained if the electrical circuit was arranged at a relatively long distance outside the region of the two ionization chambers, which is no longer possible with the fire alarm device now described because of the requirement that it shall be capable of being mounted on a flat surface without damage to the surface. Outside of the region between the two central electrodes there are present only the electrical connecting wires and compensation or adjusting devices which may possibly be necessary, such as an adjustable resistor 14 for adjusting the sensitivity of the fire-alarm device.

Since the dimensions within the housing must be kept very small, and therefore the separation of the two central electrodes cannot exceed some 20 mm, and the distance between the central electrode 10 of the reference ionization chamber from the counter-electrode 12 likewise should not exceed 20 mm, very close dimension tolerances are necessary. A discrepancy of only 1/10 mm in the electrode separation in the reference chamber considerably alters the sensitivity of the fire alarm device. It is therefore very important that the electrode spacing in the reference ionization chamber shall be made adjustable. This may be achieved very simply, for example, by forming the outer or external electrode 12 in part at least as a flexible diaphragm or membrane which may be deformed by means of an adjusting screw 15 to vary the characteristics of the chamber.

A further problem is the maintenance of the insulation in the measuring chamber at locations where it is exposed to the external air and where reduction of the insulation resistance is to be expected as a result of dust deposits. For this reason, the leakage paths between the central electrode 7 and the base or housing components which are held at a different potential is lengthened by suitable construction of the surfaces, for example, by providing grooves 16 or equivalent expedients in the surface.

By adopting these measures it may be ensured that despite its reduced dimensions, as compared with formerly available ionization fire alarm devices, improved sensitivity, increased detection reliability and an earlier or more rapid response of the ionization fire-alarm device can be attained.

While there is shown and described present preferred embodiments of the invention, it is to be distinctly understood that the invention is not limited thereto but may be otherwise variously embodied and practiced within the scope of the following claims. Accordingly,

What is claimed is:

1. An ionization fire alarm device comprising a measuring ionization chamber, a resistance element defining a reference ionization chamber, said measuring ionization chamber being electrically connected in series with said reference ionization chamber, an electric circuit electrically coupled with both of said ionization chambers, said measuring ionization chamber incorporating an electrode in the form of a plate positioned to shield the interior of said measuring ionization chamber from said electric circuit with which said electrode is connected, said reference ionization chamber incorporating an electrode in the form of a plate positioned to shield the interior of said reference ionization chamber from said electric circuit, said electric circuit comprising substantially all of its essential elements being positioned between said two plate electrodes.

2. An ionization fire alarm device as defined in claim 1, wherein said electric circuit is encapsulated in a block of insulating material.

3. An ionization fire alarm device as defined in claim 1, wherein each said plate electrode substantially possesses the form of a disc.

4. An ionization fire alarm device as defined in claim 1, wherein the spacing of said plate electrodes from one another does not exceed 20 mm.

5. An ionization fire alarm device as defined in claim 1, wherein said reference ionization chamber includes a second electrode forming a wall of such chamber, and wherein the distance between said electrodes of said reference ionization chamber does not exceed 20 mm.

6. An ionization fire alarm device as defined in claim 5, further including means for varying the spacing between said electrodes of said reference ionization chamber.

7. An ionization fire alarm device as defined in claim 1, wherein said reference ionization chamber includes a second electrode, at least one of both electrodes of said reference ionization chamber being constructed as a movable membrane for the purpose of adjusting the spacing between said electrodes of said reference ionization chamber.

8. An ionization fire alarm device as defined in claim 7, further including means for displacing said movable membrane in order to vary the characteristics of said reference ionization chamber.

9. An ionization fire alarm device comprising a measuring ionization chamber, a resistance element defining a reference ionization chamber, said measuring ionization chamber being electrically connected in series with said reference ionization chamber, an electric circuit electrically coupled with both of said ionization chambers, said measuring ionization chamber incorporating an electrode in the form of a plate positioned to shield the interior of said measuring ionization chamber from said electric circuit with which said electrode is connected, said reference ionization chamber incorporating an electrode in the form of a plate positioned to shield the interior of said reference ionization chamber from said electric circuit, said electric circuit being positioned between said two plate electrodes, an insulating member supporting said plate electrode of said measuring ionization chamber, said insulating member possessing a surface formed to provide an extended leakage path between said plate electrode of said measuring ionization chamber and another metallic member at a different potential.

10. An ionization fire alarm device comprising a measuring ionization chamber, a resistance element defining a reference ionization chamber, said measuring ionization chamber being electrically connected in series with said reference ionization chamber, an electric circuit electrically coupled with the interconnected electrodes positioned within each of said ionization chambers, said measuring ionization chamber incorporating an electrode in the form of a plate, and an insulating member supporting said plate electrode of said measuring ionization chamber, said insulating member possessing a surface formed to provide an extended leakage path between said plate electrode of said measuring ionization chamber and another metallic member at a different potential.

* * * * *